US006245216B1

(12) United States Patent
Hill et al.

(10) Patent No.: US 6,245,216 B1
(45) Date of Patent: *Jun. 12, 2001

(54) METHOD FOR FLUIDIZING TARS

(75) Inventors: Philip Dean Hill, Baton Rouge, LA (US); Thomas Edwin Pruitt, Deer Park; Forrest Lee Sanders, Katy, both of TX (US); Gilles Guerin, Eaubonne; Bruno Langlois, Sainte Genevieve des Bois, both of (FR)

(73) Assignee: Rhodia Inc., Cranbury, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,742

(22) Filed: Feb. 20, 1997

Related U.S. Application Data

(60) Provisional application No. 60/011,977, filed on Feb. 20, 1996.

(51) Int. Cl.$^7$ .................................................. C10G 17/00
(52) U.S. Cl. ............................... 208/13; 208/432; 208/39; 208/42; 208/44; 208/320
(58) Field of Search ............................... 208/13, 432, 92, 208/44, 370

(56) References Cited

U.S. PATENT DOCUMENTS

| | | |
|---|---|---|
| 1,542,035 | 6/1925 | Cone . |
| 1,722,211 | 7/1929 | Guardino . |
| 1,855,878 | 4/1932 | Conklin . |
| 2,052,544 | 9/1936 | Bartholomew .......................... 23/177 |
| 2,115,091 | 4/1938 | Girsewald et al. . |
| 2,293,253 | 8/1942 | Galindo et al. ....................... 196/148 |
| 2,442,100 | 5/1948 | Showalter ............................... 134/22 |
| 2,487,103 | 11/1949 | Cone et al. ........................... 196/148 |
| 2,670,332 | 2/1954 | McCoy et al. . |
| 2,755,233 | 7/1956 | Showalter ........................... 196/148 |
| 2,762,759 | 9/1956 | Mussallem ........................... 196/148 |
| 2,782,146 | 2/1957 | Paulsen et al. ....................... 196/148 |
| 2,911,371 | 11/1959 | Weis .................................... 252/153 |
| 3,025,190 | 3/1962 | Groom et al. ........................ 134/10 |
| 3,296,165 | 1/1967 | Kemp . |
| 3,436,263 | 4/1969 | Strenkert et al. ....................... 134/22 |
| 3,535,160 | 10/1970 | Arger ..................................... 134/22 |
| 3,793,221 | 2/1974 | Otrhalek et al. ........................ 252/136 |
| 3,832,234 | 8/1974 | Otrhalek et al. .......................... 134/4 |
| 3,833,010 | 9/1974 | McDermott et al. ................... 134/24 |
| 3,925,231 | 12/1975 | Ritzi ..................................... 252/171 |
| 3,960,742 | 6/1976 | Leonard ................................. 252/90 |
| 3,962,151 | 6/1976 | Dekker et al. ........................ 252/548 |
| 4,032,466 | 6/1977 | Otrhalek et al. ....................... 252/136 |
| 4,089,703 | 5/1978 | White ................................. 134/22 C |
| 4,206,001 | 6/1980 | Knowlton et al. ....................... 134/12 |
| 4,233,174 | 11/1980 | Sheridan ............................... 252/170 |
| 4,364,776 | 12/1982 | McBride et al. ........................ 134/10 |
| 4,376,108 | 3/1983 | Lowiciki et al. . |
| 4,414,035 | 11/1983 | Newberry et al. ....................... 134/3 |
| 4,474,622 | 10/1984 | Forster .................................. 134/10 |
| 4,592,786 | 6/1986 | Williams et al. ................. 134/22.18 |
| 4,619,709 | 10/1986 | Fiocco ............................. 134/22.14 |
| 4,646,837 | 3/1987 | Kruka .................................. 166/304 |
| 4,686,048 | 8/1987 | Atherton et al. ..................... 210/771 |
| 4,842,715 | 6/1989 | Paspek et al. ........................... 208/13 |
| 4,891,131 | * 1/1990 | Sadeghi et al. ....................... 208/390 |
| 4,897,205 | 1/1990 | Landry ................................ 210/766 |
| 5,049,256 | 9/1991 | Luce ..................................... 208/13 |
| 5,085,710 | 2/1992 | Goss ................................. 134/22.14 |
| 5,206,021 | * 4/1993 | Dookhith et al. ..................... 252/352 |
| 5,288,392 | 2/1994 | Santos .................................. 208/13 |
| 5,306,351 | 4/1994 | Anderson ............................... 134/40 |
| 5,405,439 | 4/1995 | Marchal . |
| 5,425,814 | 6/1995 | Krajicek et al. .................... 134/22.1 |

FOREIGN PATENT DOCUMENTS

| | | |
|---|---|---|
| 162591 | 11/1985 | (EP) . |
| 0652260A1 | 5/1994 | (EP) .............................. C08L/95/00 |
| 1524345 | 5/1968 | (FR) . |
| 0527609 | 10/1940 | (GB) . |

OTHER PUBLICATIONS

AN 86–175744, Derwent Publications Ltd., London, GB & SU 1198099.

* cited by examiner

*Primary Examiner*—Helane Myers
(74) *Attorney, Agent, or Firm*—Katherine L. Carleton

(57) ABSTRACT

Process for the preparation of an aqueous tar suspoemulsion by mixing a mixture including (a) a viscous tar composition formed from a tar, from inorganic solids and, optionally, from water, (b) water (W), (c) a surface-active agent (SA) exhibiting an HLB of at least 10 and, optionally, (d) a thickening water-soluble polymer (TWP) with a molecular mass of greater than 10,000, the relative amounts of constituents (W), (SA) and, optionally, (TWP) being such that the viscosity of the (W)+(SA)+optional (TWP) mixture is preferably equal to or greater than the viscosity of the said tar, and then optional dilution of the mixture obtained with water or with an aqueous acidic solution. The process is particularly advantageous when applied to to the residues, containing sulphuric acid, resulting from the synthesis of white oils from petroleum fractions. The present invention further relates to a method for fluidizing acidic tars/sludges including contacting the tar/sludge with sulfuric acid and a surfactant. Optionally, a carrier for the surfactant's incorporation into the tar/sludge can be utilized. This provides an effective process for cleaning sulfuric acid tars/sludges from containers/vessels such as transportation containers, pipes and storage tanks. Preferably, the process includes the additional step of regeneration of sulfuric acid from the fluidized tar/sludge.

48 Claims, No Drawings

METHOD FOR FLUIDIZING TARS

Priority to U.S. Provisional Application Ser. No. 60/011,977, filed Feb. 20, 1996, is hereby claimed and said application is incorporated herein by reference.

FIELD OF INVENTION

The present invention relates to methods for fluidizing tars and sludges. Specifically, the invention relates to processes for cleaning tars, such as spent acid tars, from reaction vessels, process equipment, transportation containers and storage tanks utilizing sulfuric acid, surfactants and optionally a carrier.

BACKGROUND OF THE INVENTION

Undesirable products/by products are formed in several chemical reaction processes. In many cases these undesirable products tend to separate in storage containers, reactors and other process equipment as highly viscous, sticky or sometimes solid matter of unknown chemical composition. These are typically referred to by those skilled in the art as tars or sludges. Their physical nature often times makes them difficult to remove from the containers/vessels where they occur (reactors, storage tanks, transportation containers, pipes or the like) by normal material handling processes such as pumping. Build up over time subtracts from the liquid-load carrying or storage capacity of the containers/vessels. Tars can be formed either during a chemical reaction process, a physical process such as distillation or during storage and/or transportation. The tars can be classified as organic, acidic etc. based on the physical and chemical characteristics they exhibit. Many organic substances, other than those having a simple structure and a low boiling point, result after pyrolysis, that is to say heating in the absence of air, in very viscous liquids known as tars.

Large amounts of tar residues are thus produced by industrial processes. These tars can thus consist of residues resulting from the destructive distillation of organic matter. The distillation of crude oil produces tar residues known as bitumens or alternatively asphalts. These bitumens are generally mixtures of hydrocarbons of high molecular mass (in particular from 500 to 3000), most often of asphaltenes (which can represent up to 25% by weight of the tar), and of organic substances which are very rich in carbon and in hydrogen but which can also contain oxygen, sulfur or nitrogen, as well as traces of metal elements, in particular nickel and vanadium. Mention may be made, as examples, of the viscous tar residues resulting from the synthesis of white oils from petroleum fractions. These viscous tars can contain an acid, in particular sulfuric acid.

These tars constitute waste which, because of its very high viscosity, is impossible or extremely difficult to pump and to spray and cannot be easily and inexpensively incinerated; this is highly disadvantageous, in particular when it is desired to recover the waste acids which it may contain. The tars must thus be handled like solids Their incineration in a rotary furnace is a substantial cost and can potentially contribute to air pollution.

The present invention provides a process for treating these tars which makes it possible to remove the above-mentioned disadvantages. One process of the present invention makes it possible to condition these residues in a fluid form which can be diluted with water or with acid, in highly varied proportions, and which is stable on storage.

Sulfuric acid is used in reactions such as sulfonations, nitration, or as a catalyst such as in alkylation in the petroleum refinery operations or for other uses such as drying, pickling etc. At the end of these processes, the sulfuric acid remains in a form which is not usable and has to be recovered or disposed. This sulfuric acid is commonly referred to as spent acid or spent sulfuric acid. The spent acid can be processed to recover usable sulfuric acid by a number of processes including the process of regeneration.

It is common practice to store the spent acid in storage tanks prior to recovery of the sulfuric acid either at site or transport them off-site for recovery or disposal. Common transportation modes are tank trucks, rail cars, barges and pipelines.

Tars have been found to be present in some spent acids. When spent acid is associated with tars, they pose operational problems in material handling and recovery during storage and transportation. When tars are formed in reactors and process equipment, such as heat exchangers, they reduce the operational capability of the process and the equipment. The tars are a heavy, viscous material which tend to stick to the containers, and in some instances, over a period of time increase in viscosity and react to form solid deposits in the containers. Removal of such tars by normal pumping techniques from storage tanks, reactors or pressure transfer from tank trucks and rail cars, is difficult due to the high viscosity and in some cases the solid nature of the material.

In industrial practice, it is common to remove such tars by physical means such as cutting and opening a passage into the container followed by physical removal or by a vacuum technique. A highly viscous tar is not transportable with ordinary small diameter four or five inch lines using standard available vacuum trucks, most of which are usually capable of creating a vacuum of about twenty seven to twenty eight inches of water column. Where masses of material cannot be suctioned, personnel are required to manually enter and remove the material.

Having to place personnel in intimate physical contact with the tar/sludge can result in significant health, safety and environmental issues. When the tar is laden with volatile or hazardous materials personnel safety and protective equipment can significantly slow the removal process. Often all of the tar/sludge can not be removed and the problem of disposal or transportation remains.

A process of the present invention is advantageous in that it does not involve any physical alteration to the tank to remove the tar/sludge. Instead, it involves treating the tar with sulfuric acid and a surfactant to allow blending of the tar/sludge with the sulfuric acid. The process provides a safer alternative to the existing methods of cleaning, especially tank cleaning, in that it does not involve any confined space entry or otherwise exposing individuals to potential safety hazards. Another advantage of the process is the ability to recover the tar/sludge in a form which can be easily transported, handled and pumped. Further, it is rendered in a condition for recovery of saleable sulfuric acid by the regeneration process.

SUMMARY OF THE INVENTION

The present invention relates to a process for the preparation of an aqueous tar suspoemulsion, characterized in that a mixture (M) comprising:
a viscous tar composition formed (i) from at least one tar generally exhibiting a viscosity at least equal to about 3 Pa·s, preferably at least equal to about 30 Pa·s, (ii) from inorganic solids and, optionally, (iii) from water,
water (W),
at least one surface-active agent (SA) exhibiting an HLB (hydrophilicity/lipophilicity balance) of at least about 10, for example of at least about 12, and, optionally, at least one thickening water-soluble polymer (TWP) with a molecular mass greater than about 10,000, generally greater than about 100,000, is mixed, the relative amounts of constituents (W), (SA) and, optionally, (TWP) being such that the viscosity of the (W)+(SA)+optional (TWP) mixture is equal to or greater than about one tenth of the viscosity of said tar, preferably equal to or greater than the viscosity of said tar, and in that the mixture obtained is optionally diluted with water or with at least one aqueous acidic solution.

The present invention also relates to a method for fluidizing acidic tars/sludges comprising contact with sulfuric acid and a surfactant. Optionally, a carrier for the surfactant's incorporation into the tar/sludge can be utilized. This provides an effective process for cleaning sulfuric acid tars/sludges from containers/vessels such as transportation containers, pipes and storage tanks.

A process for cleaning sulfuric acid tars/sludges from containers/vessels comprises the steps of contacting the tar/sludge with sulfuric acid and surfactant, recirculating the fluidized tar/sludge until all of the tar/sludge has been fluidized to a pumpable media, and removing the fluidized tar/sludge from the container/vessel. Preferably, the process comprises the additional step of incineration of the sludge and regeneration of the sulfuric acid.

Unless otherwise stated, all parts or percents are parts or percents respectively by weight.

Viscosity is understood to mean, in the present account, the dynamic viscosity measured at 25° C. using a Brookfield viscometer according to AFNOR standard NFT 76-102 of February 1972.

The term suspoemulsion is employed here to denote an emulsion containing inorganic solids or particles.

"Comprising," as used herein, means various components can be conjointly employed. Accordingly, the terms "consisting essentially of" and "consisting of" are embodied in the term comprising.

DETAILED DESCRIPTION OF THE INVENTION

The present invention relates to a process for the preparation of an aqueous tar suspoemulsion, characterized in that a mixture (M) comprising:

a viscous tar composition formed (i) from at least one tar generally exhibiting a viscosity at least equal to about 3 Pa·s, preferably at least equal to about 30 Pa·s, (ii) from inorganic solids and, optionally, (iii) from water, water (W), at least one surface-active agent (SA) exhibiting an HLB (hydrophilicity/lipophilicity balance) of at least about 10, for example of at least about 12, and, optionally, at least one thickening water-soluble polymer (TWP) with a molecular mass greater than about 10,000, generally greater than about 100,000, is mixed, the relative amounts of constituents (W), (SA) and, optionally, (TWP) being such that the viscosity of the (W)+(SA)+optional (TWP) mixture is equal to or greater than one tenth of the viscosity of the said tar, preferably equal to or greater than the viscosity of said tar, and in that the mixture obtained is optionally diluted with water or with at least one aqueous acidic solution.

The viscous tar composition can generally contain:

from about 2 to about 70%, preferably from about 5 to about 30%, for example from about 10 to about 25%, by weight of tar;

from about 5 to about 50%, preferably from about 10 to about 45%, for example from about 25 to about 40%, by weight of inorganic solids;

from 0 to about 70%, preferably from about 5 to about 65%, for example from about 30 to about 65%, by weight of water.

The viscous tar composition thus preferentially contains water. The tar+inorganic solids combination forms a water-immiscible phase. These inorganic solids generally result from the synthesis of the tar.

Mention may be made, as examples of inorganic solids present in the viscous tar composition to be emulsified, of in particular diatomaceous earths, silica powders, quartz, sand, sand-gravel mix, calcium carbonate, mica, talc, sulfur or traces of metal elements; the particle size of these inorganic solids is generally from approximately 0.001 to 300 $\mu$m.

The mixture (M) to be mixed very advantageously comprises, in addition to the viscous tar composition, per 100 parts by weight of tar:

from about 30 to about 200, preferably from about 40 to about 120, parts by weight of water (W), and either from about 2 to about 20, preferably from about 3 to about 15, parts by weight of at least one surface-active agent (SA) or, preferably, on the one hand, from about 0.5 to about 10, preferably from about 1 to about 10, parts by weight of at least one surface-active agent (SA) and, on the other hand, from about 0.001 to about 15, preferably from about 0.1 to about 10, parts by weight of at least one thickening water-soluble polymer (TWP).

In particular, the mixture (M) to be mixed can comprise, in addition to the viscous tar composition, per 100 parts by weight of tar:

from about 45 to about 100, for example from about 60 to about 100, parts by weight of water (W), and either from about 5 to about 10 parts by weight of at least one surface-active agent (SA) or, preferably, on the one hand, from about 2 to about 5 parts by weight of at least one surface active agent (SA) and, on the other hand, from about 0.5 to about 5 parts by weight of at least one thickening water-soluble polymer (TWP).

According to one alternative form of the invention, it will be possible to use, depending on the tar content of the viscous tar composition, preferably of between about 2 and about 70% by weight, an amount of mixture containing about 2 to about 6% of surface-active agent(s) (SA) and from about 0.5 to about 2.5% of thickening water-soluble polymer(s) (TWP) in water (W) of between about 1/20 and about 1/4, in particular between about 1/15 and about 1/5, for example between about 1/13 and about 1/6, of the amount of viscous tar composition; it will be possible in particular for this ratio to be between about 1/9 and about 1/7.

Besides the viscous tar composition and the water (W), the mixture (M) to be mixed comprises at least one surface-active agent (SA) exhibiting an HLB of at least about 10, for example of at least about 12. The surface-active agent (SA) can be chosen from nonionic, anionic, cationic, zwitterionic or amphoteric surface-active agents having an HLB of at least about 10, or their mixtures.

It is thus possible to employ at least one anionic surface-active agent with an HLB of at least about 10 chosen from alkali metal alkylbenzenesulphonates, alkyl sulphates, alkyl ether sulphates, alkylaryl ether sulphates, dialkyl sulphosuccinates, alkyl phosphates or ether phosphates.

It is possible to use at least one cationic surface-active agent with an HLB at least equal to about 10 chosen from aliphatic or aromatic fatty amines, aliphatic fatty amides or quaternary ammonium derivatives.

Ionic surface-active agents with an HLB greater than 20 may be suitable. It is also possible to employ at least one zwitterionic or amphoteric surface-active agent with an HLB of at least about 10 chosen from betaines and their derivatives, sultaines and their derivatives, lecithins, imidazoline derivatives, glycinates and their derivatives, amidopropionates or fatty amine oxides.

Use is preferably made of at least one nonionic surface-active agent exhibiting an HLB of at least about 10 chosen, for example, from alkoxylated fatty acids, polyalkoxylated alkylphenols, polyalkoxylated fatty alcohols, polyalkoxylated or polyglycerolated fatty amides, polyglycerolated alcohols and α-diols or ethylene oxide/propylene oxide block copolymers, as well as alkylglucosides, alkylpolyglucosides, sucroethers, sucroesters, sucroglycerides or sorbitan esters.

The mixture (M) to be mixed preferably also comprises at least one thickening water-soluble polymer (TWP) with a molecular mass greater than about 10,000 (g/mol), generally greater than about 100,000 (g/mol).

The said thickening water-soluble polymer (TWP) is generally soluble to at least about 50% in water. Mention may in particular be made, as examples of thickening water-soluble polymers (TWP) which can be used, of:

those obtained by chemical synthesis, such as poly(vinyl alcohol)s, poly(ethylene glycol)s, polyvinylpyrrolidones or poly(alkali metal acrylate)s, those extracted from plants and optionally modified, such as carrageenans, alginates, carboxymethyl celluloses, methyl celluloses, hydroxypropyl celluloses or hydroxyethyl celluloses, and those obtained by biosynthesis, such as xanthan gum.

The surface-active agent(s) (SA)+thickening water-soluble polymer(s) (TWP) system constitutes a very effective stabilizing/dispersing agent for the viscous tar composition.

The relative amounts of water (W), of surface-active agent(s) (SA) and of optional water-soluble polymer(s) (TWP) are a function of the viscosity of the tar of the viscous tar composition, as well as of the nature of the (mixture of) surfactant(s) (SA) and of the nature of the (mixture of) optional thickening water-soluble polymer(s) (TWP). These relative amounts are such that the viscosity of the (W)+(SA)+optional (TWP) mixture is equal to or greater than about one tenth of the viscosity of the tar, preferably equal to or greater than the viscosity of the tar.

The amounts of surface-active agent(s) (SA) and of thickening water-soluble polymer(s) to be used are generally low, which is very advantageous, in particular from an economic viewpoint.

The mixing operation is carried out for a time and under shear conditions which are sufficient for an emulsion of "oil-in-water" type to be obtained. The mixing time, which generally increases as the viscous tar composition becomes richer in tar, can be only between about 0.5 and about 4 hours. Slow stirring is, moreover, generally sufficient.

The operation of emulsifying the tar can be carried out by:

introducing the viscous tar composition into a water (W)+surface-active agent(s) (SA)+optional thickening water-soluble polymer(s) (TWP) mixture and then mixing at a temperature generally of between approximately about 10 and about 50° C.; or introducing the water (W) into a viscous tar composition entirely or partially present+surface-active agent(s) (SA)+optional thickening water-soluble polymer(s) (TWP) mixture and then mixing at a temperature generally of between approximately about 10 and about 50° C., the amount of viscous tar composition optionally remaining being introduced into the mixture after the formation of an emulsion of "oil-in-water" type while maintaining the mixing.

Any conventional mixing device can be utilized, particularly slow-stirring devices. Thus, the mixing operation can be carried out in a mixer equipped with a stirrer, a stirrer in which the mobile part does not rotate at more than about 2500 revolutions/min (preferably not at more than about 1500 revolutions/min and, more particularly, not at more than about 500 revolutions/min) with a tangential velocity at the end of the mobile part not exceeding about 20 m/s (preferably not exceeding about 5 m/s and, more particularly, not exceeding about 2.5 m/s); advantageously, the tangential velocity at the end of the mobile part/distance between the end of the mobile part and the wall of the mixer ratio is less than about 50,000 $s^{-1}$, preferably less than about 10,000 $s^{-1}$ and, more particularly, less than about 2500 $s^{-1}$. Mention may be made, by way of examples, of single- or multiple-screw extruders, planetary mixers, hook mixers, slow dispersers, static mixers or paddle, propeller, arm or anchor mixers.

The viscous tar composition can also contain a hydrocarbon phase which exhibits a viscosity which is much lower than that of the tar or a viscosity in the region of or equal to that of the tar.

Monitoring of the distribution of the sizes of the particles which they contain shows that the tar suspoemulsions obtained according to the process of the invention are stable on storage.

The tar suspoemulsions obtained according to the process of the invention are completely dilutable with water or with an aqueous acidic solution (in particular a nitration waste acid), for example an aqueous sulfuric acid solution. They can thus be easily pumped and can be easily sprayed into an incineration furnace for liquids.

They can generally exhibit a viscosity of less than about 80 mPa·s (in particular for a water content of greater than about 55% by weight), in particular of less than about 6 mPa·s (in particular for a water content of greater than about 65% by weight), for example at a gradient of about 3 $s^{-1}$.

The starting viscous tar composition can in particular be a residue resulting from the synthesis of white oils from petroleum fractions. The process according to the invention finds a particularly advantageous application when the starting viscous tar composition contains at least one acid, in particular sulfuric acid, as often in the case of a residue resulting from the synthesis of white oils from petroleum fractions. It is then in particular possible, and this constitutes another object of the invention, to recover the sulfuric acid by preparing, according to the process described above, an aqueous tar suspoemulsion, diluted with water or with an aqueous sulfuric acid solution, and by then incinerating the dilute aqueous tar suspoemulsion.

The following example illustrates the invention without, however, limiting the scope thereof. It is realized that charges and variations may be made that are not shown below. Such changes which do not materially alter the process, formulation or function are still considered to fall within the spirit and scope of the invention as recited by the claims that follow.

EXAMPLE

Use is made of a viscous tar composition with the following composition (% by weight):

| | |
|---|---|
| tar | 16% |
| inorganic solids | 34% |
| water | 50% |

The inorganic solids content is determined by combustion at 950° C. and the water content by thermogravimetric analysis at 100° C.

The viscosity of the tar is greater than 50 Pa·s.

A mixture is prepared which contains, in water (% by weight):

1.5% of Guar CSA 200/50 (thickening water-soluble polymer);

2% of Soprophor B.S.U.® (ethoxylated tristyrylphenol with an HLB equal to 12.5 (non-ionic surface-active agent));

2% of Soprophor 3D33 (phosphated and ethoxylated tristyrylphenol with an HLB equal to 16 (anionic surface-active agent)).

For this, the Guar is added to water with vigorous stirring, the surfactants are then introduced and the mixture is homogenized with gentle stirring in order not to generate foam. The viscosity of the mixture after 1 hour is approximately 21 Pa·s.

50 grams of this mixture are placed in a mixer equipped with a gate-type paddle rotating at 500 revolutions/min and 7 times 50 grams of the abovementioned viscous tar composition are added thereto; stirring is maintained until the mixture is homogeneous.

An aqueous tar suspoemulsion is then obtained which has the following composition (% by weight):

| | |
|---|---|
| tar + other organic matter | 28.5% |
| inorganic solids | 14.5% |
| water | 57.0% |

This dispersion contains particles with a mean size of 4.0 μm. Monitoring the distribution of the sizes of the particles shows that this aqueous suspoemulsion is stable for at least 48 hours. This dispersion is then easily diluted with a waste acid containing 60% of $H_2SO_4$ in water.

A fluid aqueous suspoemulsion is obtained which contains (% by weight):

20.5% of tar+other organic matter 7.0% of inorganic solids 72.5% of water+acid.

This aqueous suspoemulsion is easily pumped and then sprayed into a furnace in order to be incinerated therein.

As previously mentioned, tars/sludges originate from different sources. Acid tars/sludges are formed in reactions which use sulfuric acid, oleum (fuming sulfuric acid) and sulfurtrioxide (SO3) as reactant, medium or catalyst. A typical process using sulfuric acid, oleum or sulfurtrioxide as a reactant is the sulfonation reaction where these react with organic compounds resulting in sulfonic acids. There are several instances of organic sulfonic acids in chemistry and industrial practice. In many cases, excess sulfuric acid is used for the sulfonation in order to fully utilize the organic compound being sulfonated and the sulfuric acid also acts as a solvent and reaction medium during the sulfonation process. After the desired product, namely, the sulfonic acid has been recovered, the process has to deal with the handling and disposal of the spent acid. Both during the sulfonation process and thereafter during storage of the spent acid, tars/sludges are formed.

Another source of tar/sludge would be a reaction where sulfuric acid is not the primary reactant but acts as a medium for the reaction. A typical example of such a reaction would be a nitration reaction where nitric acid is the primary reactant and sulfuric acid is necessary to promote the reaction of the organic compound with the nitric acid. Nitrations are typically done with what is called a nitrating acid which is a mixture of nitric acid and sulfuric acid. Here again, as in sulfonation, both during the nitration and after the nitro compound has been isolated, the spent acid which contains sulfuric acid and other impurities has to be recovered. This is another source for tar/sludge.

In the process of manufacture of high grade gasoline, sulfuric acid is used as a catalyst in the reaction called alkylation. The alkylation process involves the reaction of "light" olefins containing 3,4 and/or 5 carbon atoms with isobutane in the presence of an acid catalyst. Typically, the olefins are propylene, 2-butene and 2-methyl butene and the predominant products are a mixture of 2,4 Dimethylpentane, 2,2,4 Trimethylpentane and 2,2,5 Trimethylpentane. There are competing side-reactions which result in polymerizations. After the recovery of the gasoline, the spent acid (commonly known as "alky spent" to designate the origin of the spent acid) is transferred to storage tanks and then transported for sulfuric acid regeneration. Tars are known to form during the alkylation reaction and tend to accumulate in the storage tanks and transportation containers.

The sulfuric acid present in the tars and sludges from the above processes typically ranges from about 15% to about 90%, preferably from about 20% to about 80% in strength. Typically the tar/sludge can contain sulfuric acid in the range of 20% to 80%, water from 10% to 35% a carrier such as diesel, xylene or other organic chemicals in the range of from about 1% to about 30% and carbonaceous matter commonly referred to as tar in the range of 10% to 55%. The tars/sludges can have a viscosity of from about 2000 to greater than 10,000 centipoise.

The first component of the present invention is an inorganic acid. The inorganic acid employed in this invention is a strong acid, such as sulfuric acid ($H_2SO_4$). Sulfuric acid suitable for use is any commercially available sulfuric acid. Typically, this can be any of the commercially available concentrations –77.7%, 93.2%, 99%, 100%, 104.5%, 109% and 114.6%. The last three concentrations are also referred to in commerce as 20%, 40% and 65% Oleum. The strength of the acid utilized can vary depending on the type of tar to be treated. Strengths below 77.7% can be utilized, such as ranging below about 76% or below about 70% or less. Generally, the preferred strength for use herein is the 93% sulfuric acid. Phosphoric acid can be utilized in the place of sulfuric acid. Mixtures of sulfuric and phosphoric can also be utilized.

The second component of the invention is the surface-active agent, otherwise referred to herein as "surfactant." Suitable surfactants for use are nonionic surfactants, cationic surfactants, amphoteric (including zwitterionics) surfactants, anionic surfactants and mixtures thereof. Preferred surfactants for use are nonionic surfactants, cationic surfactants, anionic surfactants and mixtures thereof. Amphoterics are not preferred for use with acidic tars/sludges, particularly spent sulfuric acid tars/sludges.

Preferably, the surfactant is compatible with the acid environment and more preferably also stable in non-acid environments. Preferably, compatibility is determined by the absence of any reaction between the surfactant and the acid and tar system and also by the stability of the fluidized tar resulting from the use of the surfactant system. Some degree of reaction can be acceptable and it is within the skill of an artisan to determine the compatibility.

Preferred surfactants useful herein include: mixed octyl/decyl alcohols which are ethoxylated and propoxylated, nonlyphenoxypoly(ethyleneoxy)ethanol, polyethoxylated tallow amine, isopropylaminealkylarylsulfonate, dinonylphenoxypoly(ethyleneoxy)-ethanol, mixtures of ethoxylated and propoxylated tallow amine and mixtures thereof. Amphoteric surfactants which can be utilized include: sodiumlauriminodipropionate, cocamidopropylbetaine, cocoamphohydroxypropyl sulfonate and mixtures thereof. Based on the composition of the tars, selection of the appropriate surfactant is made and experimentally tested for the stability (gelling, heat evolution and reaction with the tar components) of the mix of the tar with the acid system.

Surfactants having an HLB of at least about 10 or their mixtures are preferred for use. Ionic surfactants with an HLB greater than about 20 are also preferred.

Examples of useful nonionic surfactants include condensates of ethylene oxide with a hydrophobic moiety which has an average hydrophilic lipophilic balance (HLB) between about 8 to about 16, and more preferably, between about 10 and about 12.5. These surfactants include the condensation products of primary or secondary aliphatic alcohols having from about 8 to about 24 carbon atoms, in either straight or branched chain configuration, with from about 2 to about 40, and preferably between about 2 and about 9 moles of ethylene oxide per mole of alcohol.

In a preferred embodiment the aliphatic alcohol comprises between about 9 and about 18 carbon atoms and is ethoxylated with between about 3 and about 12 moles of ethylene oxide per mole of aliphatic alcohol.

Preferred nonionic surfactants exhibiting an HLB of at least about 10 can be chosen, for example, from alkoxylated fatty acids, polyalkoxylated alkylphenols, polyalkoxylated fatty alcohols, polyalkoxylated or polyglycerolated fatty amides, polyglycerolated alcohols and -diols or ethylene oxide/propylene oxide block copolymers, as well as alkylglucosides, alkylpolyglucosides, sucroethers, sucroesters, sucroglycerides or sorbitan esters.

Other suitable nonionic surfactants include the condensation products of about 6 to about 12 carbon atom alkyl phenols with about 3 to about 30, and preferably between about 4 and 14 moles of ethylene oxide. Examples of such surfactants are sold under the trade names Igepal CO 430, Igepal CO 530, Igepal CO 630, Igepal CO 720 and Igepal CO 730 by Rhone-Poulenc Inc. Still other suitable nonionic surfactants are described in U.S. Pat. No. 3,976,586. To the extent necessary, this patent is expressly incorporated by reference.

Other suitable nonionic surfactant for use herein are sold under the trade names Antarox TA 4400 and Antarox BL 240 by Rhone-Poulenc Inc.

Cationic surfactants suitable for use include the quaternary compounds imidazolines, dialkyl quats and benzyl quats as well as the amine oxides, fatty imidazolines and ethoxylated amines.

Cationic surfactants suitable for use are ethoxylated tallow amines disclosed in U.S. Pat. No. 5,409,574, issued Apr. 25, 1995, to Razac et al. and to the extent necessary incorporated herein by reference.

The propoxylated fatty amine ethoxylate surfactants used in the invention can be represented by the general average formula:

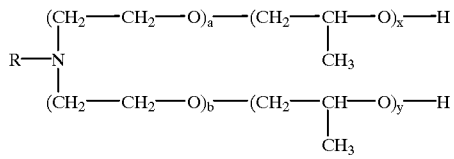

where R suitably represents hydrocarbon groups containing an average value of between 1–30 carbon atoms, and wherein a plus b represent from 0 to about 50 moles ethylene oxide (EO), and x and y represent from 0 to about 20 moles propylene oxide (PO), the sum of a, b, x, and y being at least 2, and preferably from about 6 to about 22, it being understood that a, b, x, and y represent average numerical values and that the formula is an average representation, the various groups being disposed independently in each amine substituent chain, e.g., EO-PO-EO, EO-EO-PO, EO-EO-EO, PO-PO-PO, EO-PO-PO, PO-EO-PO and the like.

The hydrocarbon groups can be aliphatic or aromatic, and, if aliphatic, can be linear, branched or cyclic in nature, and can be the same or different particularly in the case of fatty radicals which are a composite of various chain length materials. The aliphatic hydrocarbon radical can contain ethylenic unsaturation. Preferably the aliphatic groups are selected from among alkyl groups, and substituted alkyl groups thereof, such as long chain alkyl groups, preferably having from 6 to 30, preferably 6 to 22, carbon atoms, such as stearyl, lauryl, oleyl, cetyl, tridecyl, tetradecyl, hexadecyl, dodecyl, octadecyl, nonadecyl, tallow, coco, soya, myristyl and other natural fatty radicals from animal, fish, vegetable and oil seed sources (coconut oil, palm kernel oil, babassu oil, rape seed oil, sunflower seed oil and the like) or substituted groups thereof, derived from natural or synthetic sources. These compounds can be illustrated by cocamine ethoxylate propoxylate, laurylamine ethoxylate propoxylate, tallowamine ethoxylate propoxylate, oleylamine ethoxylate propoxylate, stearylamine ethoxylate propoxylate, myristylamine ethoxylate propoxylate, cetylamine ethoxylate propoxylate and the like.

Preferred cationic surfactants with an HLB at least equal to about 10 can be chosen from alipatic or aromatic fatty amines, aliphatic fatty amides or quaternary ammonium derivatives.

Commercially available cationic surfactants for use are RHODAMEEN® PN 430, RHODAMEEN® VP-532/SPB and RHODAMEEN® ethoxylated fatty amines, ALKAQUAT® and RHODAQUAT® cationic quaternaries, RHODAMOX® amine oxides, and MIRAMINE® cationic imidazolines and fatty amine condensates sold by Rhone-Poulenc Inc., Cranbury, N.J.

Examples of suitable amphoteric surfactants include the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates and alkyl amphopropionates wherein alkyl represents an alkyl group having 6 to 20 carbon atoms. Other suitable amphoteric surfactants include alkyl iminopropionates, alkyl iminodipropionates and alkyl amphopropylsulfonates having between 12 and 18 carbon atoms; alkyl betaines and amidopropyl betaines and alkyl sultaines and alkylamidopropylhydroxy sultaines wherein alkyl represents an alkyl group having 6 to 20 carbon atoms.

Particularly useful amphoteric surfactants include both mono and dicarboxylates such as those of the formulae:

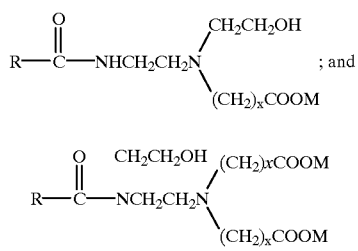

wherein R is an alkyl group of 6–20 carbon atoms, x is 1 or 2 and M is hydrogen or sodium. Mixtures of the above structures are particularly preferred.

Other formulae for the above amphoteric surfactants include the following:

Alkyl betaines

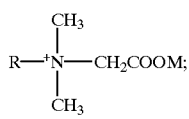

Amidopropyl betaines

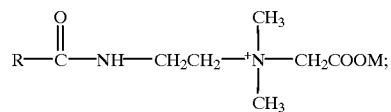

Alkyl sultaines

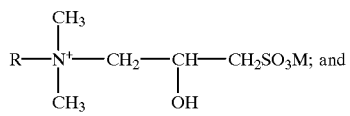

Alkyl amidopropylhydroxy sultaines

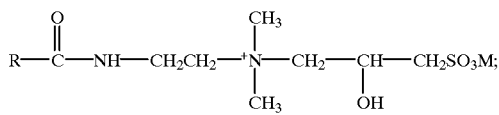

where R is a alkyl group of 6–20 carbon atoms and M is potassium, sodium or a monovalent cation.

Of the above amphoteric surfactants, particularly preferred are the alkali salts of alkyl amphocarboxyglycinates and alkyl amphocarboxypropionates, alkyl amphodipropionates, alkyl amphodiacetates, alkyl amphoglycinates, alkyl amphopropyl sulfonates and alkyl amphopropionates wherein alkyl represents an alkyl group having 6 to 20 carbon atoms. Even more preferred are compounds wherein the alkyl group is derived from coconut oil or is a lauryl group, for example cocoamphodipropionate. Such cocoamphodipropionate surfactants are commercially sold under the trademarks MIRANOL C2M-SF CONC. and MIRANOL FBS by Rhône-Poulenc Inc. Other commercially useful amphoteric surfactants include:

cocoamphoacetate (sold under the trademarks MIRANOL ULTRA C-32 and MIRAPON FA), cocoamphopropionate (sold under the trademarks MIRANOL CMSF CONC. and MIRAPON FAS), cocoamphodiacetate (sold under the trademarks MIRANOL C2M CONC. and MIRAPON FB), lauroamphoacetate (sold under the trademarks MIRANOL HM CONC. and MIRAPON LA), lauroamphodiacetate (sold under the trademarks MIRANOL H2M CONC. and MIRAPON LB), lauroamphodipropionate (sold under the trademarks MIRANOL H2M-SF CONC. AND MIRAPON LBS), lauroamphodiacetate obtained from a mixture of lauric and myristic acids (sold under the trademark MIRANOL BM CONC.), and cocoamphopropyl sulfonate (sold under the trademark MIRANOL CS CONC.)

caproamphodiacetate (sold under the trademark MIRANOL S2M CONC.), caproamphoacetate (sold under the trademark MIRANOL SM CONC.), caproamphodipropionate (sold under the trademark MIRANOL S2M-SF CONC.), and stearoamphoacetate (sold under the trademark MIRANOL DM).

Also useful herein are the betaines and amidobetaines which are compounds of the general structure:

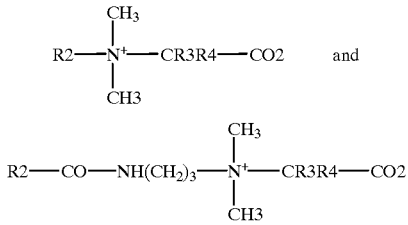

respectively wherein R2 is C8–C22 alkyl or alkenyl; R3 is H or C1–C4 alkyl; and R4 is H or C1–C-4 alkyl.

The betaines useful herein include the high alkyl betaines such as cocodimethyl carboxymethyl betaine, lauryl dimethyl carboxymethyl betaine, lauryl dimethyl alpha-carboxy-ethyl betaine, cetyl dimethyl carboxymethyl betaine, lauryl bis-(2-hydroxy-ethyl)carboxy methyl betaine, stearyl bis-(2-hydroxy-propyl)carboxymethyl betaine, oleyl dimethyl gamma-carboxypropyl betaine, and lauryl bis-(2-hydroxypropyl)alpha-carboxyethyl betaine. The sulfobetaines are also preferred and may be represented by cocodimethyl sulfopropyl betaine, stearyldimethyl sulfopropyl betaine, lauryl dimethyl sulfoethyl betaine, lauryl bis-(2-hydroxy-ethyl)sulfopropyl betaine and mixtures thereof. A particularly preferred composition utilizes cocoamidopropyl betaine.

Preferred amphoteric (including zwitterionic) surfactants with an HLB of at least about 10 can be chosen from betaines and their derivatives, sultaines and their derivatives, lecithins, imidazoline derivatives, glycinates and their derivatives, amidopropionates or fatty amine oxides.

Useful anionic surfactants include any of the known hydrophobes attached to a carboxylate, sulfonate, sulfate or phosphate polar, solubilizing group including salts. Salts may be the sodium, potassium, calcium, magnesium, barium, iron, ammonium and amine salts of such surfactants.

Examples of such anionic surfactants include water soluble salts of alkyl benzene sulfonates having between 8 and 22 carbon atoms in the alkyl group, alkyl ether sulfates having between 8 and 22 carbon atoms in the alkyl group, alkali metal, ammonium and alkanolammonium salts or organic sulfuric reaction products having in their molecular structure an alkyl, or alkaryl group containing from 8 to 22 carbon atoms and a sulfonic or sulfuric acid ester group.

Preferred anionic surfactants with an HLB of at least about 10 can be chosen from alkali metal alkylbenzenesulphonates, alkyl sulphates, alkyl ether sulphates, alkylaryl ether sulphates, dialkyl sulphosuccinates, alkyl phosphates or ether phosphates.

Particularly preferred are linear sodium and potassium alkyl ether sulfates that are synthesized by sulfating a higher alcohol having between 8 and 18 carbon atoms and having 2 to 9 moles of ethylene oxide. Another anionic surfactant is alkyl benzene sulfonate, in which the alkyl group contains between about 9 to about 15, and preferably, between about 11 to about 13 carbon atoms in a straight chain or branched chain configuration and most preferably a linear straight chain having an average alkyl group of about 11 carbon atoms.

Mixtures of anionic surfactants can be utilized, including mixtures of alkyl or alkylaryl sulfonate and sulfate surfactants. Such embodiments comprise a mixture of alkali metal salts, preferably sodium salts, of alkyl benzene sulfonates having from about 9 to 15, and more preferred between 11 and 13 carbon atoms with an alkali metal salt, preferably sodium, of an alkyl sulfate or alkyl ethoxy sulfate having 10 to 20 and preferably 12 to 18 carbon atoms and an average ethoxylation of 2 to 4.

Anionic surfactants which may be selected include linear alkyl benzene sulfonates such as dodecylbenzene sulfonate, decylbenzene sulfonate, undecylbenzene sulfonate, tridecylbenzene sulfonate, nonylbenzene sulfonate and the sodium, potassium, ammonium, triethanolammonium and isopropylammonium salts thereof. A preferred anionic surfactant is a linear isopropylamine dodecylbenzene sulfonate; one of which is sold under the tradename Rhodacal® IPAM by Rhône-Poulenc Inc. A suitable sulfonate salt is sodium dodecylbenzene sulfonate. Such chemicals are sold under the trade name Biosoft 100 by Stepan Chemicals of Northfield, Ill. Other anionic surfactants include polyethoxylated alcohol sulfates, such as those sold under the trade name Neodol 25-3S by Shell Chemical Company. Examples of other anionic surfactants are provided in U.S. Pat. No. 3,976,586. To the extent necessary, this patent is expressly incorporated by reference.

An optional component is a carrier for the introduction of the surfactant into the tar/sludge. The carrier can be aqueous or organic and is preferably selected from the group consisting of water, diesel, xylene, methyl isobutyl ketone, isopropyl alcohol, an inorganic acid (e.g., sulfuric acid) and dimethylsulfoxide. It is used for ease of introduction of the surfactant, to provide stability to the mix and result in effective clean-out of the tar/sludges from the containers. Preferred carriers are water, diesel xylene and mixtures thereof and most preferred is diesel.

Another optional component is a suspending agent such as guar gum, a polysaccharide blend or other similar acting polymer can be utilized. A preferred guar is sold under the tradename Jaguar® by Rhône-Poulenc Inc.

The process of the present invention can comprise the addition of the acid and surfactant into the container/vessel containing the tar/sludge. Preferably, the surfactant and acid are premixed prior to introduction to the container/vessel. Another method of addition is to introduce the surfactant premixed with a carrier and introduce the acid separately. When the tar/sludge to be fluidized has an acid strength of greater than about 20%, preferably greater than about 30%, more preferably greater than about 40% and most preferably greater than about 50%, there can be sufficient acid present such that additional acid need not be added and the surfactant with the acid present in the tar will act sufficiently to fluidize the tar/sludge and clean the container/vessel. To fluidize the tar/sludge is to provide a pumpable/flowable mixture.

Mechanical agitation and or external recirculation can be utilized. However, mechanical agitation and or external recirculation are not necessary. The surfactant, acid and tar/sludge can be contacted and allowed to remain in contact for a sufficient amount of time to achieve fluidization.

The second embodiment/process of the present invention is applicable to acidic tars/sludges and to nonacidic tars/sludges. It is preferred for use with acidic tars/sludges. Surprisingly, the method of the present invention cleans the containers vessels until substantially free of tar/sludge, i.e., preferably about 90% free, more preferably about 95% free and most preferably about 100% free of tar sludge material.

Blending the surfactant with the acid, preferably sulfuric acid, is preferably done within the approximate temperature range of from about 60° F. (16° C.) to about 150° F. (66° C.) and more preferably within the approximate range of from about 75° F. (24° C.) to about 100° F. (38° C.). Excessively high temperatures are not employed since they can result in charring and the formation of solid carbonaceous matter. The highest recommended temperature by the invention without any significant charring is about 150° F. (66° C.).

A process of the present invention for cleaning storage tanks and transportation containers until substantially free of the sludge and tars comprises contacting the tar/sludge with sulfuric acid of about 75% to about 98% concentration at a temperature of from about 60° F. to about 150° F.; introducing a surfactant into the tar/sludge/sulfuric acid mix at concentrations ranging from about 0.2% to about 7.5% by weight of the final blend and optionally contacting the tar/sludge with diesel, xylene, water or other carrier. Further, the present invention relates to a process in which the contacting is done by mechanical agitation and or external recirculation in a tank, or introduction of the acid-surfactant mix in the suction side of a pump and recirculating through the tank/transportation containers via nozzles or openings at the top or sides of the tank/transportation containers.

The following examples are provided to better describe and define the present invention without, however limiting the scope thereof. They are for illustrative purposes only, and it is realized that changes and variations may be made that are not shown below. Such changes which do not materially alter the process, formulation or function are still considered to fall within the spirit and scope of the invention as recited by the claims that follow.

Example 1

In this example tar is cleaned out from a rail car which is full of tar. Removing the tar manually by cutting an access is deemed too costly and the other option would be to dispose of the car in a land vault. The spent acid tar cited in this example results from a plant which manufactures a specialty chemical and uses sulfuric acid in the sulfonation process. The process also uses xylene among other organic species. After the process, the spent acid is transferred to a rail car for transportation to a sulfuric acid recovery facility. The rail car is examined and three layers of material are discovered in the rail car. The tar is distributed between the three layers. Laboratory evaluation of the rail car contents reveals a flammable top layer comprising xylene and considerable difficulty in handling of the tar layer which is the predominant layer. Based on this evaluation, the rail car is cleaned as follows: A batch process is utilized. Two strengths of sulfuric acid are utilized. Commercially available sulfuric acid of 93% strength is used for blending with the tar and commercially available sulfuric acid of 78% is used to flush the transfer line. RHODACAL IPAM a commercially available anionic surfactant (supplied by Rhone-Poulenc Inc., Cranbury, N.J.) is used for blending with the tar. About 66 parts of 93% sulfuric acid is charged into a batch mix tank equipped with an agitator. This is followed by the introduction of about 0.8 parts of RHODACAL IPAM (a linear isopropylamine dodecylbenzene sulfonate). About 100 parts of tar containing layer is then transferred from the rail car under a nitrogen pressure of about 50 psig into the mix tank containing the 93% sulfuric acid and the surfactant. After the transfer, the rail car is rinsed with about 35 parts of 78% sulfuric acid and the rinse is also transferred under nitrogen pressure to the mix tank. This flushes the transfer lines. The tank contents are agitated for about one hour. Then, the tank contents are transferred into a rail car for transportation to a facility for sulfuric acid recovery. The resulting fluidized spent acid is stable and tar does not separate during subsequent transportation. The rail car is rendered completely cleaned.

Example 2

In the method cited in this example, tar is cleaned out of a 25,000 gal (14 feet wide, 22 feet tall) storage tank which is used to store spent sulfuric acid from an alcohol process in a chemical manufacturing facility. The process at this facility produces some tar during the manufacturing operation. This tar is carried over with the spent acid and accumulates in the storage tank. Over a period extending over about 18 months, the tar accumulates to a point where the tank is rendered unusable. The method of this invention is used for the purposes of cleaning the tank and inspecting the tank since tank inspections would not be meaningful in view of the tar coated surface. The tar in the tank is sampled and analyzed. The tank contains about 37% sulfuric acid, about 20% water and the remainder is carbonaceous matter of unknown composition. The viscosity is in excess of about 10,000 centipoise as tested by Brookfield viscometer. The free standing acid in the tank is pumped out of the tank leaving unpumpable tar in the tank along with small quantities of free standing acid. Adding additional sulfuric acid is not necessary in view of the origin of the tar and the fact that the tar contains 37% sulfuric acid. Diesel is utilized as a carrier to facilitate the mixing of the tar with the surfactant. Accordingly about 5 parts of diesel are mixed with about 1 part of Dinonylphenoxy(ethyleneoxy)ethanol surfactant (commercially available as IGEPAL CO 630 supplied by Rhone-Poulenc Inc.) in a mix tank. The diesel-surfactant mix is introduced into the side of the tank by a recirculation pump. The quantities utilized result in about 94 parts of the tar being treated with about 5 parts of diesel and about 1 part of surfactant. The liquid from the tank is recirculated into the tank. This recirculation process is continued until the viscosity is below about 800 centipoise. The tank contents are then transferred to tank trucks. Inspection of the tank reveals complete removal of the tar.

Example 3

In the method described in this example, tar from a similar alcohol process as described in Example 2 is removed from a rail car. In this example, the tar clean-out is accomplished without mechanical agitation or external recirculation. The clean-out is achieved by allowing the tar to stand with a surfactant carrier mix. There is a significant tar layer floating on the top of spent acid. Initially, the free acid from the rail car is transferred under air pressure. To about 750 gallons of diesel, about three 55 gallon drums containing Polyethoxylated Tallowamine surfactant (commercially available as RHODAMEEN PN 430 supplied by Rhône-Poulenc Inc.) are added and mixed. Half the diesel-surfactant mix is transferred to the rail car containing the tar. This is followed by the addition of 93% sulfuric acid to the rail car. The contents are allowed to stand in the rail car for 24 hours. During this time, the tar fluidized. This batch is pumped out to the storage tank for recovery of sulfuric acid. To the residue in the rail car, the remaining half of the diesel-surfactant blend is transferred to the rail car contents followed by more 93% sulfuric acid. The contents in the rail car are allowed to stand for another 24 hours and then pumped to storage. This process completely dissolves/breaks up into pumpable size the tar and allows for the complete removal of the tar from the rail car.

Example 4

A 227,700 gallon storage tank accumulates tars to almost 10 feet in height on the top of the spent sulfuric acid stored in the tank, over a period of several months. Accordingly, the free acid in the bottom layer is drained from the tank and transferred to another tank for recovery. This results in the tar layer dropping to the bottom of the tank. 93% Sulfuric Acid is introduced into the tank from the top using a centrifugal pump in an amount corresponding to about 2 parts of 93% Sulfuric Acid for about 1 part of tar. Isopropylamine alkyl aryl sulfonate surfactant (RHODACAL IPAM supplied by Rhône-Poulenc Inc.) is introduced into the suction side of the pump and delivered into the tank over the tar-sulfuric acid layer at a ratio of about 0.013 parts of Surfactant per about 1 part of tar. Recirculation continues for approximately 48 hours during which time the fluidization of the tar is periodically checked by inserting a rod from the top of the tank. When inspection reveals fluidization of the tar, the tank contents are transferred to storage for sulfuric acid recovery. The tank is inspected and found to be clean and free of the tar.

What is claimed is:

1. A process for fluidizing tars/sludges or cleaning tars/sludges from a container, said process comprising contacting the tar/sludge with an inorganic acid selected from the group consisting of sulfuric acid, phosphoric acid, and mixtures thereof, and a surfactant.

2. Process according to claim 1, wherein said inorganic acid is sulfuric acid.

3. Process according to claim 2, wherein said sulfuric acid concentration is greater than about 75%.

4. Process according to claim 2 further comprising the step of recovery of said sulfuric acid by regeneration.

5. Process according to claim 1 wherein said surfactant is selected from the group consisting of nonionic surfactants, cationic surfactants, amphoteric surfactants, anionic surfactants and mixtures thereof.

6. Process according to claim 5, wherein said surfactant is selected from the group consisting of:
  i) alkali metal alkylbenzene sulphonates, alkyl sulphates, alkyl ether sulphates, alkylaryl ether sulphates, dialkyl sulphosuccinates, alkyl phosphates, and ether phosphates;
  ii) aliphatic or aromatic fatty amines, aliphatic fatty amides and quaternary ammonium derivatives;
  iii) betaines and their derivatives, sultaines and their derivatives, lecithins, imidazoline derivatives, glycinates and their derivatives, amidopropionates and fatty amine oxides;

iv) alkoxylated fatty acids, polyalkoxylated alkylphenols, polyalkoxylated fatty alcohols, polyalkoxylated or poly glycerolated fatty amides, polyglycerolated alcohols and -diols orethylene oxide/propylene oxide block copolymers, alkylglucosides, alkylpolyglucosides, sucroethers, sucroesters, sucroglycerides and sorbitan esters; and v) mixtures thereof.

7. Process according to claim 5, wherein said surfactant has an HLB value of at least about 10.

8. Process according to claim 8, wherein said tar/sludge comprises an acid.

9. Process according to claim 8, wherein said surfactant is selected from the group consisting of nonionic surfactants, cationic surfactants, anionic surfactants and mixtures thereof.

10. Process according to claim 8, wherein said tar/sludge comprises sulfuric acid.

11. Process according to claim 10 further comprising the step of recovery of said sulfuric acid by regeneration.

12. Process according to claim 1, wherein said inorganic acid and surfactant are premixed before contact with said tar/sludge.

13. Process according to claim 1, wherein said surfactant is premixed with a carrier before contact with the tar/sludge.

14. A process according to claim 13, wherein said carrier is selected from the group consisting of water, diesel, xylene, methyl isobutyl ketone, isopropyl alcohol, dimethylsufoxide, sulfuric acid and mixtures thereof.

15. Process according to claim 1 further comprising the step of recirculating the fluidized tar/sludge until all of the tar/sludge has been converted to a pumpable media and removing the tar/sludge.

16. Process according to claim 1, wherein said surfactant is selected from the group consisting of mixed octyl/decyl alcohols which are ethoxylated and propoxylated, nonlyphenoxy poly (ethyleneoxyl) ethanol, polyethoxylated tallow amine, isopropylaminealkyl sulfonate, dinonylphenoxylpoly (ethyleneoxy) ethanol, mixtures of ethoxylated and propoxylated tallow amine and mixtures thereof.

17. Process according to claim 1, wherein said surfactant is selected from the group consisting of cationic surfactants.

18. Process according to claim 17, wherein said cationic surfactant is selected from the group consisting of fatty amine ethoxylate surfactants represented by the general average formula:

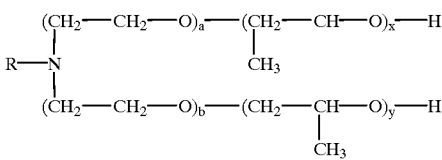

where R suitably represents hydrocarbon groups containing an average value of between 1–30 carbon atoms, and wherein a plus b represent from 0 to about 50 moles ethylene oxide (EO), and x and y represent from 0 to about 20 moles propylene oxide (PO), the sum of a, b, x, and y being independent and representing average values, the. sum of a,b,x, and y being at least 2.

19. A method for removing acid tar/sludges from a container, said method consisting essentially of contacting the acid tar/sludge with a surfactant and carrier, wherein the tar/sludge comprises at least one inorganic acid selected from the group consisting of sulfuric acid and phosphoric acid.

20. Process according to claim 10, wherein said acid tar/sludge comprises from about 20% to about 80% sulfuric acid.

21. Process according to claim 20, wherein said carrier is selected from the group consisting of water, diesel, xylene, methyl isobutyl ketone, isopropyl alcohol, dimethylsufoxide, sulfuric acid and mixtures thereof.

22. The process of claim 19, wherein the inorganic acid is essentially free of hydrochloric acid.

23. Process comprising the steps of contacting a tar/sludge with a surfactant and carrier, whereby the tar/sludge having an acid strength of greater than about 20% is substantially removed, wherein the tar/sludge comprises at least one inorganic acid selected from the group consisting of sulfuric acid and phosphoric acid.

24. Process according to claim 23 further comprising the step of mechanical agitation or external recirculation.

25. Process according to claim 23, wherein said tar/sludge comprises an inorganic acid selected from the group consisting of sulfuric acid, phosphoric acid and mixtures thereof.

26. Process according to claim 25, wherein said surfactant is selected from the group consisting of: nonionic, anionic, cationic, zwitterionic or amphoteric surfactants and mixtures thereof.

27. Process according to claim 26, wherein said surfactant has an HLB of at least about 10.

28. The process of claim 23, wherein the inorganic acid is essentially free of hydrochloric acid.

29. Process comprising the steps of contacting a tar/sludge with acid of about 75% to about 90% concentration at a temperature of about 60° F. to about 150° F. and with a surfactant at a concentration of about 0.2% to about 7.5% by weight of the final blend, wherein the acid comprises at least one inorganic acid selected from the group consisting of sulfuric acid and phosphoric acid.

30. The process of claim 29, wherein the inorganic acid is essentially free of hydrochloric acid.

31. A process for fluidizing tars/sludges or cleaning tars/sludges from containers/vessels comprising contacting the tar/sludge with a composition consisting essentially of an inorganic acid selected from the group consisting of sulfuric acid, phosphoric acid, and mixtures thereof, and a surfactant.

32. Process according to claim 31, wherein said inorganic acid is sulfuric acid.

33. Process according to claim 32, wherein said surfactant is selected from the group consisting of nonionic surfactants, cationic surfactants, amphoteric surfactants, anionic surfactants, and mixtures thereof.

34. Process according to claim 32, wherein said tar/sludge comprises an inorganic acid.

35. Process according to claim 34, wherein said inorganic acid is sulfuric acid.

36. Process according to claim 35, further comprising the step of recovering sulfuric acid by regeneration.

37. Process according to claim 31, wherein said surfactant has an HLB value of at least about 10.

38. Process according to claim 31 wherein said composition additionally consists of a carrier selected from the group consisting of water, diesel, xylene, methyl isobutyl ketone, isopropyl alcohol, dimethylsufoxide, sulfuric acid and mixtures thereof.

39. Process according to claim 31, further comprising the steps of recirculating the tar/sludge until all of the tar/sludge has been converted to a pumpable media and removing the tar/sludge.

40. The process of claim 31, wherein the inorganic acid is essentially free of hydrochloric acid.

41. A process for fluidizing tars/sludges or cleaning tars/sludges from containers/vessels comprising contacting the tar/sludge with an inorganic acid and a surfactant, wherein the inorganic acid is selected from the group consisting of sulfuric acid, phosphoric acid, and mixtures thereof, and the inorganic acid is essentially free of hydrochloric acid.

42. Process according to claim 41, wherein said inorganic acid is sulfuric acid.

43. Process according to claim 42, wherein said tar/sludge comprises an inorganic acid.

44. Process according to claim 43, further comprising the step of recovering sulfuric acid by regeneration.

45. Process according to claim 41, wherein said surfactant is selected from the group consisting of nonionic surfactants, cationic surfactants, amphoteric surfactants, anionic surfactants, and mixtures thereof.

46. Process according to claim 41, wherein said surfactant has a hydrophilicity/lipophilicity balance of at least about 10.

47. Process according to claim 41, additionally comprising the step of adding a carrier selected from the group consisting of water, diesel, xylene, methyl isobutyl ketone, isopropyl alcohol, dimethylsufoxide, sulfuric acid and mixtures thereof.

48. Process according to claim 41, further comprising recirculating the tar/sludge until all of the tar/sludge has been converted to a pumpable media and removing tar/sludge.

* * * * *